United States Patent
Joshi et al.

(10) Patent No.: US 6,609,430 B1
(45) Date of Patent: Aug. 26, 2003

(54) LOW PROFILE TRANSDUCER FOR FLOW METERS

(76) Inventors: Shrinivas G. Joshi, 20340 Downing Ct., Brookfield, WI (US) 53045; Boris D. Zaitsev, Sokolovaya str. 44/62, Apt. 44, Saratov (RU), 410030

( * ) Notice: Subject to any disclaimer, the term of this patent is extended or adjusted under 35 U.S.C. 154(b) by 0 days.

(21) Appl. No.: 09/567,357

(22) Filed: May 9, 2000

(51) Int. Cl.[7] ................................................. G01F 1/66
(52) U.S. Cl. .......................... 73/861.25; 73/861.26; 73/861.27; 73/861.28; 73/861.29
(58) Field of Search .................. 73/861.25, 861.26, 73/861.27, 861.28, 861.29; 310/313 R, 313 B, 334, 336, 338

(56) References Cited

U.S. PATENT DOCUMENTS

| | | | |
|---|---|---|---|
| 3,891,869 A | 6/1975 | Scarpa ........................ 310/8.2 |
| 3,978,731 A | * 9/1976 | Reeder et al. ........... 73/407 PR |
| 4,333,028 A | 6/1982 | Panton ........................ 310/326 |
| 4,375,767 A | * 3/1983 | Magori ..................... 73/861.18 |
| 4,677,336 A | 6/1987 | Kushida et al. ............. 310/334 |
| 4,735,097 A | 4/1988 | Lynnworth ................ 73/861.28 |
| 4,838,127 A | 6/1989 | Herremans et al. ....... 73/861.28 |
| 4,930,358 A | 6/1990 | Motegi et al. ............ 73/861.28 |
| 4,932,255 A | * 6/1990 | Brace et al. .............. 73/204.11 |
| 5,452,267 A | 9/1995 | Spevak ........................ 367/163 |
| 5,488,953 A | 2/1996 | Vilkomerson ........... 128/661.08 |
| 5,540,230 A | 7/1996 | Vilkomerson ........... 188/662.04 |
| 5,594,291 A | 1/1997 | Tamai et al. ................. 310/323 |
| 5,887,089 A | * 3/1999 | Deacon et al. ................. 385/22 |
| 5,892,316 A | 4/1999 | Ashizawa et al. ........... 310/323 |
| 5,903,085 A | 5/1999 | Karam ........................ 310/328 |
| 6,114,962 A | * 9/2000 | Wiklof et al. ............. 340/572.8 |
| 6,123,673 A | * 9/2000 | Eberle et al. ................ 600/467 |

* cited by examiner

Primary Examiner—Edward Lefkowitz
Assistant Examiner—Corey D. Mack
(74) Attorney, Agent, or Firm—Andrus, Sceales, Starke & Sawall, LLP

(57) ABSTRACT

A low profile transducer (11, 12) is provided for use in flow meter for pipes of small diameter. The transducer (11, 12) has a transducer (18) or other form of transducer which transmits and receives electrical signals of three volts and 1 MHz and converts between these electrical signals and acoustic waves. In one embodiment, the transducer (18) produces surface acoustic waves (SAW), while in another embodiment the transducer (32) produces plate waves known as Lamb waves. These waves are converted to bulk acoustic waves (BAW) transmitted between the pair of transducers (11, 12).

14 Claims, 3 Drawing Sheets

LOW PROFILE TRANSDUCER FOR FLOW METERS

TECHNICAL FIELD

The field of the invention is ultrasonic transducers for use in flow meters.

BACKGROUND OF THE INVENTION

This invention is concerned with transducers for use in ultrasonic flow meters. The ultrasonic flow meter is an instrument that uses ultrasonic waves to measure the flow rate of a fluid. In operation, two transducers are placed on opposite inside wall surfaces of a pipe through which the fluid is flowing. Acoustic waves of ultrasonic frequency are generated by a first transducer and travel through the fluid to reach the second transducer. The time taken by the acoustic wave to travel from one transducer to the other, the transit time, is a function of the flow velocity of the fluid. Thus, by measuring the transit time, one can determine the fluid velocity and other relevant flow parameters.

Many transducer structures have been developed to generate and detect acoustic waves in a fluid.

One of the problems of prior transducers is that they are generally large in size and protrude a considerable distance inward from the pipe wall and into the path of the flowing fluid. This poses a problem, particularly if the diameter of the pipe is small. There is a certain minimum pipe diameter below which the present transducers cannot be used. A second problem is that the protrusion into the flow stream can allow rags, debris, and other large particulate matter to foul the transducer. This is not a problem in large pipes where the transducer does not significantly project into the flow stream, but this can be a problem in pipes of small diameter. A third problem with the current transducers is the effect they have on the flow streams themselves. The sensor can disturb the flow stream sufficiently to create erroneous flow data.

Lynnworth, U.S. Pat. No. 4,735,097, illustrates non-invasive type ultrasonic transducers which are supported at an angle in housings attached to the outside wall of a pipe to generate Rayleigh-like surface waves. These transducers are not mounted in the flow stream and the signals generated in this system are attenuated by the pipe wall.

Magori, U.S. Pat. No. 4,375,767, discloses a planar transducer using an interdigital array in which the periodicity of the interdigital array must satisfy a condition d=λ/cos α, where d=is the periodicity of the interdigital structure, λ is the wavelength of acoustic waves in the flowing medium and a is the angle of radiation of acoustic waves into the flowing medium, which is dependent on periodicity, d.

SUMMARY OF THE INVENTION

The invention provides a compact, planar transducer configuration having a transducer which is not limited by the periodicity condition of the prior art. Such a transducer, which should essentially be in the form of a thin, planar device can be mounted flush with the pipe wall resulting in minimal protrusion into the flow channel. The transducer of the present invention utilizes surface acoustic waves (SAW) or plate acoustic waves (Lamb waves) to couple energy into or out of bulk acoustic waves propagating in the fluid.

The transducer of the present invention cannot only be fabricated in a small size, but it is also much more efficient than existing transducers. This provides an output signal in response to a much lower voltage applied to the input transducer. This is particularly important in applications where engineering considerations set an upper limit to the maximum driving voltage that can be applied across the input transducer. The lowering of the drive voltage can result in significant cost savings in the packaging of the device.

The invention also provides advantageous configurations for packaging the transducer, so that it is sealed from contact with the fluid being measured while providing electrical connections to an instrument outside the pipe.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

Figure 1:
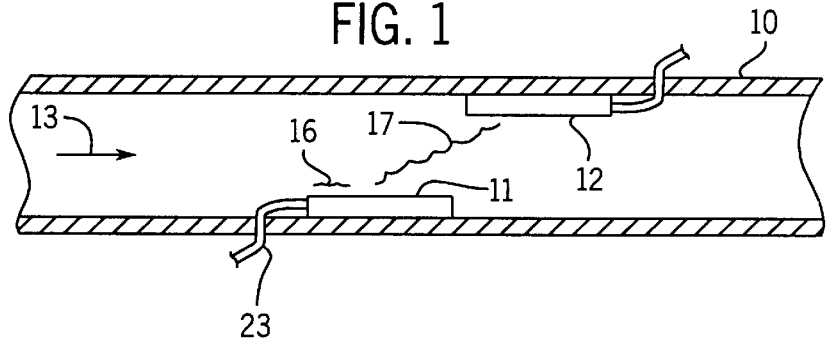
FIG. 1 is longitudinal section view of a pipe with a pair of transducers of the present invention installed in the flow stream.

FIG. 1 illustrates a section of pipe 10 in which two transducers 11, 12 of the present invention have been positioned on opposite sides of the flow stream 13 against an inside wall of the pipe 10. A fluid 13 is flowing through the pipe 10, and the object of the invention is to measure the flow velocity of the fluid. In a first embodiment of the invention, surface acoustic waves (SAW) 16 are generated on the substrate 15 of the transducer 11, which is seen in detail in FIG. 2. The transducers 11, 12 are fabricated on rectangular substrates 15 of lead zirconate titanate material (Pb $Zr_x$ $Ti_y$ $O_z$, where x, y and z are variables) having a size of approximately 16 mm wide×18 mm long×4.5 mm thickness. This material is further described and referred to in Berlincourt, Curran and Jaffe, "Piezoelectric and Piezomagnetic Materials and their Function in Transducers," *Physical Acoustics*, Vol. I, part A, W. P. Mason, Editor, pp. 169–270, Academic Press, 1964. The material of the substrate 15 is chosen such that its SAW velocity is greater than the velocity of bulk acoustic waves (BAW) 17 transmitted through the fluid 13 between the transducers 11, 12. Under these conditions, the SAW 16 will radiate bulk acoustic waves (BAW) 17 into the fluid 13. The coherent radiation of bulk acoustic waves 17 will take place at an angle a given by the equation $\cos \alpha = v_B/v_S$, where $v_B$=velocity of bulk acoustic waves 17 in the fluid 13, and $v_S$=velocity of surface acoustic waves 16 in the substrate 15.

Figure 2:
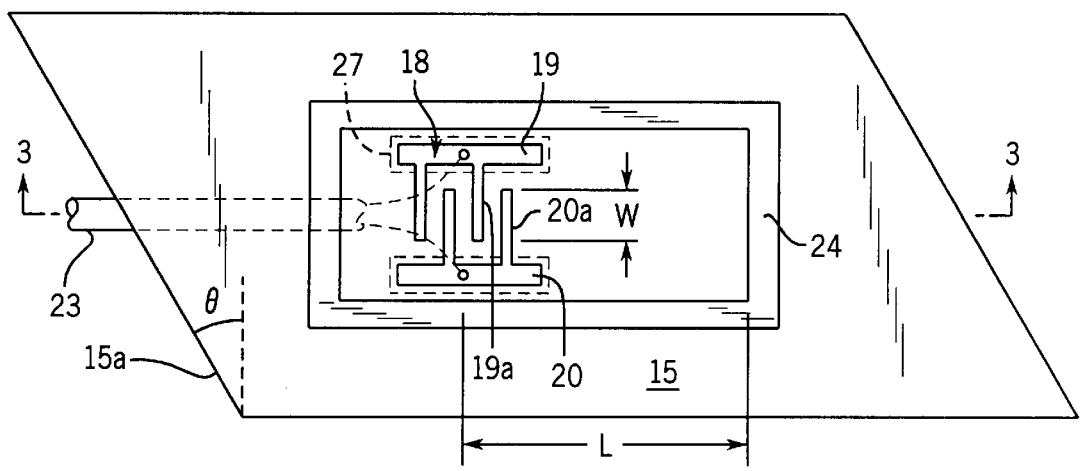
FIG. 2 is a top plan view of a first embodiment of the invention seen in FIG. 1.
Figure 3:
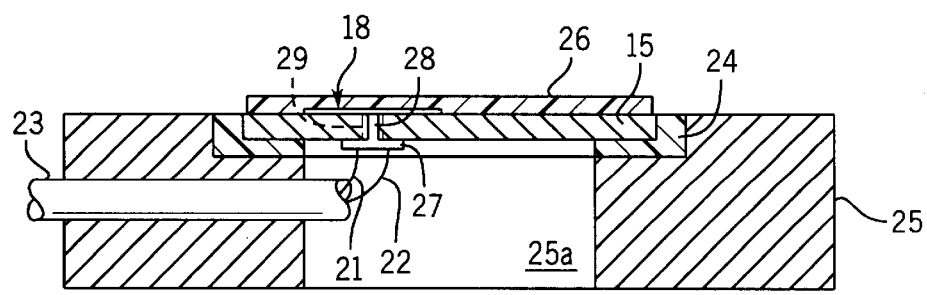
FIG. 3 is a longitudinal section view taken in the plane indicated by line 3—3 in FIG. 2.

As seen in FIG. 2, a transducer 18, sometimes referred to as an interdigital transducer or "IDT," is provided by two thin-film conductors 19, 20, each having fingers, 19a, 20a, which are received in spaces between the fingers 19a, 20a, of the opposite conductor 19, 20. The bus bars 19, 20 are electrically connected to two respective wires 21, 22, which turn, are connected to the inner and outer conductors of a coaxial cable 23 that is seen in FIGS. 2 and 3. Two holes 29 are provided in the substrate 15. This allows the routing of wires 21, 22 to the back side of the substrate 15. The wires 21, 22 are connected to thin metal films 27a, 27b (FIGS. 2 and 3) on the underside of the substrate 15, which is connected via conductors 28 in the two plated through-holes 29 in the substrate 15.

The coaxial cable 23 runs through a hole in the wall of the pipe 10 in FIG. 1, where a seal is formed by a water-insoluble epoxy sealant (not shown). The epoxy sealant 24 is also used as a seal around and under the substrate 15 in FIGS. 2 and 3 and prevents water from getting into the cavity 25a under the SAW substrate 15. The substrate is carried in a carrier 25 of plastic material which forms the cavity 25a. A cover 26 of Kynar® material, which may be a coating or a separable layer, which is disposed to completely cover the circuit substrate 15 which carries the conductors 19, 20 (collectively referred to as "the chip") to isolate, insulate and protect the chip from fluid 13 in the pipe 10. The material of the cover 26 is non-conductive. This prevents electrical shorting. The cover 26 has a thickness dimension of less than 0.08 mm thick and is bonded to the substrate 15. The thickness of the cover 26 is made much less than the acoustic wavelength, so as to minimize its effect on acoustic characteristics of the device.

With the proper geometry of the transducer 18 and selection of a length "L" (FIG. 2) between the geometric center and the end of the substrate material 15 in the direction of propagation, the energy of surface acoustic waves 16 can be efficiently converted to BAW energy and vice versa. For example, using lead zirconate titanate as a substrate material, the conversion loss from SAW to BAW and BAW to SAW has been observed to be less than 1.5 dB. A system utilizing the two transducers according to the present invention exhibits an overall electrical insertion loss of less than 15 dB. The voltage applied to the transducer 18 is typically 20 volts RMS at a frequency of 1 MHz.

Instead of the transducer 18, an optical source of energy and a pattern etched or deposited on the substrate 15 in the pattern of transducer 18, or a similar pattern of closely spaced parallel conductors, may be utilized.

Another approach that can be used to develop flat, planar transducers is to use the coupling between Lamb waves in a plate, and bulk waves in the fluid. Ultrasonic Lamb waves, sometimes also referred to as acoustic plate waves, are elastic waves propagating in plates of finite thickness. A given plate can support a number of modes of these waves, depending on the value of the ratio $h/\alpha$, where h is the plate thickness, and $\alpha$ is the acoustic wavelength. It is well known that there are three all pass modes which can propagate down to $h/\alpha=0$. These are the lowest order symmetric mode (the $S_O$ mode), the lowest order antisymmetric mode (the $A_O$ mode), and the lowest order quasi-shear horizontal mode (the $QSH_O$ mode) The velocity of the $A_O$ mode asymptotically tends to zero as $h/\alpha$ tends to zero. This is the mode that is utilized in the present application. The coupling between the $A_O$, mode and bulk waves propagating in the fluid as a function of the $h/\alpha$ has been tested for a number of different materials. A strong coupling can be obtained by a proper choice of the $h/\alpha$ ratio. A wider range of substrate materials is suitable for use with the Lamb wave devices as compared to what could be used for the SAW device. In particular, efficient Lamb wave transducers can be realized using the widely used, strong piezoelectric material, lithium niobate.

Figure 4:
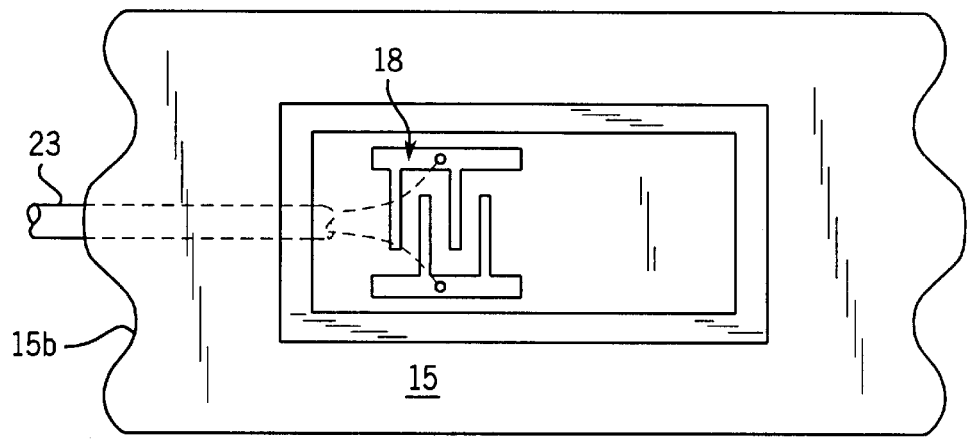
FIG. 4 is a top plan view of a second embodiment of the invention seen in FIG. 1.
Figure 5:
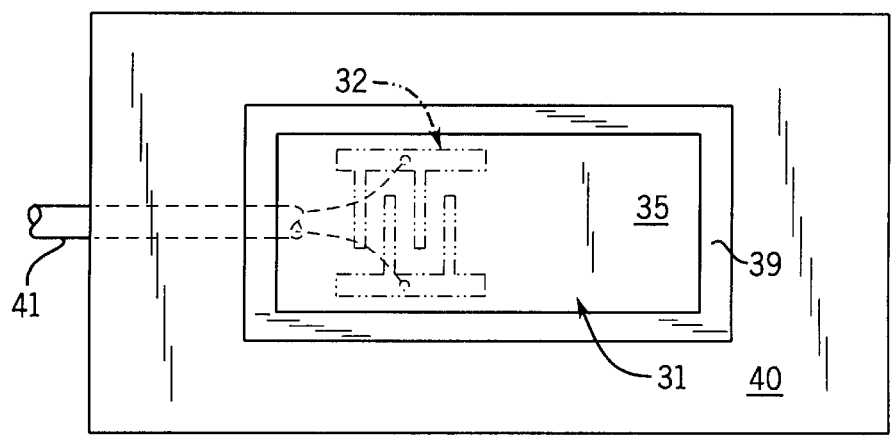
FIG. 5 is a top plan view of a third embodiment of the invention seen in FIG. 1.
Figure 6:
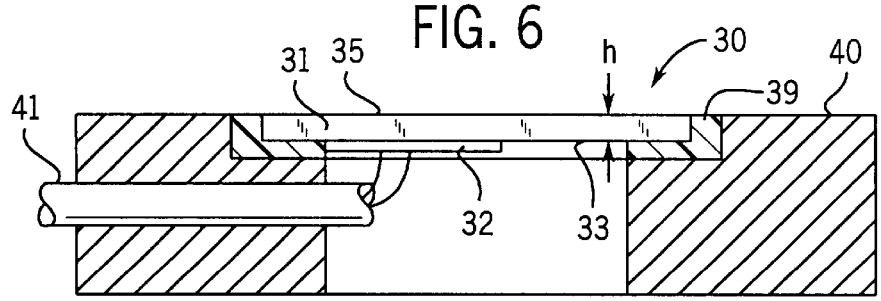
FIG. 6 is a longitudinal section view of a third embodiment of the invention taken in the same plane as FIG. 3.

A basic structure of a Lamb wave device 30 for generating acoustic waves in water is shown in FIG. 5. FIG. 5 is a top plan view and FIG. 6 is a cross-sectional view of the Lamb wave device. The device consists of a piezoelectric substrate 31 of thickness "h". The transducer 32 is similar to the transducer 18 in FIGS. 2 and 4. Transducer 32 generates Lamb waves in the substrate 31. Under proper conditions, the Lamb wave device will efficiently generate bulk acoustic waves 17 (BAW) in the fluid 13. In FIG. 6 the transducer 32 is located on a surface 33 of the substrate 31 opposite to the one 35 which is in contact with the fluid 13, thus simplifying the protection of the transducer 32 from the fluid 13. The electrical connection of a coaxial cable 41 to the transducer 32 can be made without the need for plated-through holes or other types of arrangements needed when the IDT array 32 is on the side of the substrate facing into the flow stream. The Lamb wave device 30 can be fabricated on a crystal of lithium niobate ($LiNbO_3$) as opposed to the lead zirconate titanate used for the substrate 15 in the first embodiment. This provides easier fabrication and lower device cost. Because the transducer 32 is not immersed in fluid 13 in the pipe 10, the Lamb wave device 30 will be more efficient than the SAW device 11, 12 of the first embodiment. In the Lamb wave embodiment 30, the holes in the substrate 15 of the previous embodiments and the cover 26 of Kynar® material are not necessary.

Figure 7:
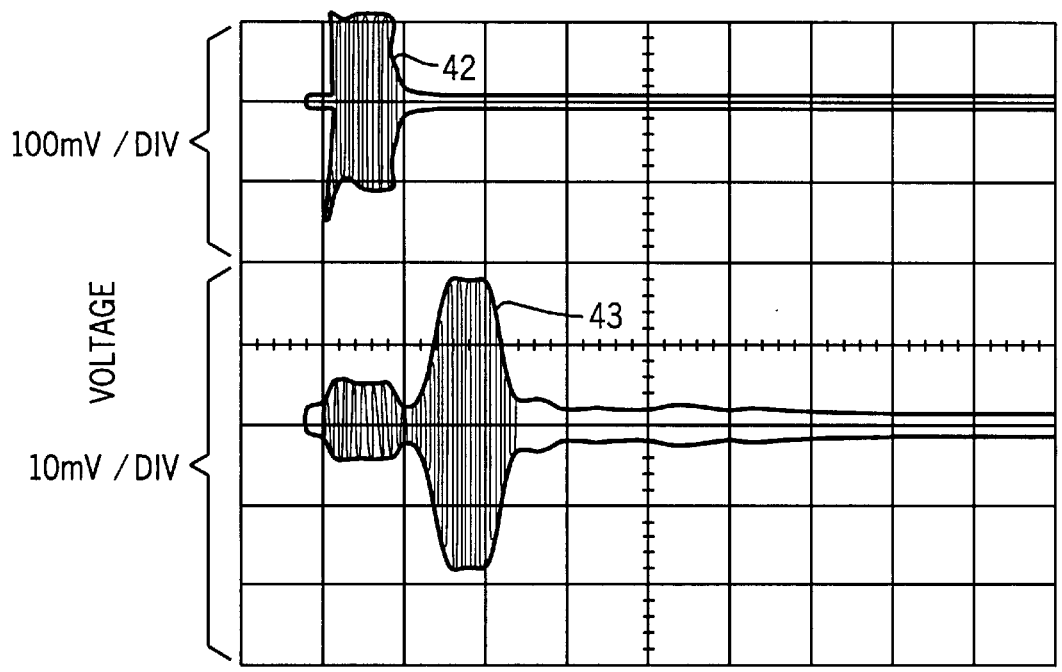
FIG. 7 is a graph of signals related to the embodiment of FIG. 4.
Figure 8:
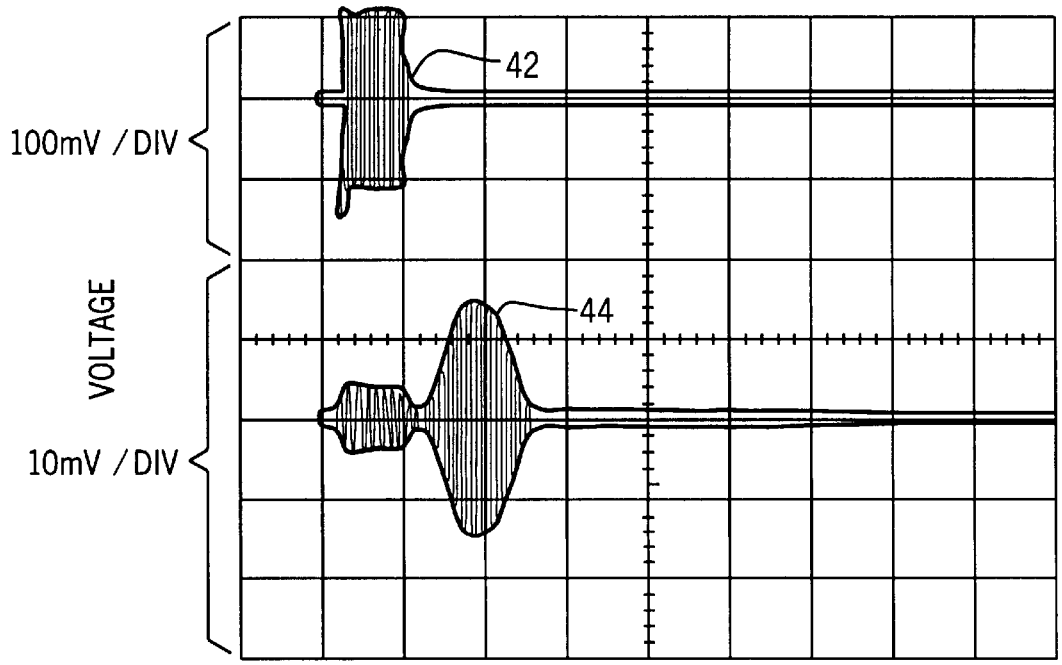
FIG. 8 is a graph of signals related to the embodiment of FIG. 2.

In the SAW device of FIGS. 1–3, the substrate 15 can be provided with corrugated edges 15b as shown in FIG. 4. This is done in order to suppress the acoustic reflections from the edges 15b. The corrugation operation, however, adds to the cost of the device. An alternative and preferred approach, which eliminates the extra cost, is to provide the substrate 15 with angled edges 15a as shown in FIG. 2. If the edge angle θ is properly selected, the signal due to a wave reflected from the edge will cancel out over the aperture, W, of the receiving transducer. The value of θ can be calculated from the equation $$\tan(2\theta)=n\lambda/W$$

where λ=SAW wavelength, W=IDT aperture which is the overlap dimension of the fingers 19a, 20a (FIG. 2) and n is any integer. Testing has shown that this approach is suitable, and the results are illustrated in FIGS. 7 and 8. FIG. 7 shows the output 43 of a device provided on a substrate 15 with corrugated edges 15b, while FIG. 8 shows the output 44 of a device having a substrate 15 with angled edges 15a. The upper wave form 42 in both FIG. 7 and FIG. 8 is the electrical signal applied to the input transducer. It can be seen that the spurious signals are reduced in the received signal (lower wave form) in FIG. 8 as compared with the received signal (lower wave form) in FIG. 7. The modification of the edges of the substrate 15 is also advantageous for use in the Lamb wave devices of FIG. 5.

The above has been a description of the detailed, preferred embodiments of the apparatus of the present invention. Various modifications to the details which are described above, which will be apparent to those of ordinary skill in the art, are included within the scope of the invention, as will become apparent from the following claims.

We claim:
1. A transducer flow measuring system for disposition along an inside wall of a pipe for transmission of bulk acoustic waves through a fluid flowing through the pipe, the transducer flow measuring system comprising:
   a substrate of a material in which a velocity of surface acoustic waves is greater than a velocity of bulk acoustic waves emitted in the fluid;
   a transducer disposed on the substrate and connectable to a source of energy for generating surface acoustic waves in the substrate material, said surface acoustic waves in turn generating bulk acoustic waves in the fluid for measuring fluid flow; and
   a carrier for carrying said substrate, said carrier having a cavity disposed between the substrate and the inside wall of the pipe for allowing electrical connections from the transducer to a region outside the pipe.

2. The transducer flow measuring system of claim 1, wherein the transducer includes
   at least two conductors made of conductive thin film material, said conductors being disposed on the substrate opposite one another, each of said two conductors having spaced apart fingers, the fingers of each of said two conductors being interdigitated with fingers on another one of said two conductors, said conductors being connectable to a signal source for producing acoustic waves in response to electrical signals; and
   wherein said two conductors are isolated from the fluid.

3. The transducer flow measuring system of claim 2, wherein the two conductors are disposed on the surface of the substrate facing towards the flow stream.

4. The transducer flow measuring system of claim 2, wherein the conductors are also responsive to the electrical signals to generate surface acoustic waves along a surface of the substrate facing towards the flow stream.

5. The transducer flow measuring system of claim 2, further comprising a body of non-conductive material covering the two conductors to insulate the two conductors from the fluid flowing through the pipe.

6. The transducer flow measuring system of claim 2, wherein the two conductors are disposed on the surface of the substrate facing away from the flow stream.

7. The transducer flow measuring system of claims 6, wherein the conductors are also responsive to the electrical signals to generate ultrasonic Lamb waves in the substrate.

8. The transducer flow measuring system of claim 1, wherein the substrate has two opposite edges formed as corrugated edges on opposite ends of two straight edges between said two opposite edges.

9. The transducer flow measuring system of claim 1, wherein the substrate is made of lead zirconate titanate material.

10. The transducer flow measuring system of claim 1, wherein the substrate is made of lithium niobate.

11. The transducer flow measuring system of claim 1, wherein the transducer includes an optical source of energy and a pattern formed on the substrate.

12. A transducer flow measuring system for disposition along an inside wall of a pipe for transmission of bulk acoustic waves through a fluid flowing through the pipe, the transducer flow measuring system comprising:
   a substrate of a material in which a velocity of surface acoustic waves is greater than a velocity of acoustic waves emitted in the fluid;
   wherein the substrate has two opposite edges formed at an angle to two edges between said opposite edges, said angle being defined by the expression $\tan(2\theta) = n\lambda/W$ where $\lambda$ = a wavelength of the surface acoustic wave, where W is an aperture dimension related to the array, and where n is any integer;
   a transducer disposed on the substrate for generating surface acoustic waves in the substrate material;
   wherein the transducer includes at least two conductors made of conductive thin film material, said conductors being disposed on the substrate opposite one another, each of said two conductors having spaced apart fingers, the fingers of each of said two conductors being interdigitated with fingers on another one of said two conductors, said conductors being connectable to a signal source for producing acoustic waves in response to electrical signals;
   wherein said two conductors are isolated from the fluid; and
   a carrier for carrying said substrate, said carrier having a cavity disposed between the substrate and the inside wall of the pipe for allowing electrical connections from the transducer to a region outside the pipe.

13. A transducer flow measuring system for disposition on along an inside wall of a pipe for transmission of bulk acoustic waves through a fluid flowing through the pipe, the transducer flow measuring system comprising:
   a substrate of a material in which a velocity of surface acoustic waves is greater than a velocity of acoustic waves emitted in the fluid;
   wherein the substrate has two plated trough-holes and conductors in said through-holes to connect the two conductors to a cable;
   a transducer disposed on the substrate for generating surface acoustic waves in the substrate material;
   wherein the transducer includes at least two conductors made of conductive thin film material, said conductors being disposed on the substrate opposite one another, each of said two conductors having spaced apart fingers, the fingers of each of said two conductors being interdigitated with fingers on another one of said two conductors, said conductors being connectable to a signal source for producing acoustic waves in response to electrical signals;
   wherein said two conductors are isolated from the fluid; and
   a carrier for carrying said substrate, said carrier having a cavity disposed between the substrate and the inside wall of the pipe for allowing electrical connections from the transducer to a region outside the pipe.

14. A transducer flow measuring system for disposition along an inside wall of a pipe for transmission of bulk acoustic waves through a fluid flowing through the pipe, the transducer flow measuring system comprising:
   a substrate of a material in which a velocity of surface acoustic waves is greater than a velocity of acoustic waves emitted in the fluid;
   wherein the substrate has two opposite edges formed at an angle to two edges between said opposite edges, said angle being defined by the expression $\tan(2\theta) = n\lambda/W$ where $\lambda$ = a wavelength of the surface acoustic wave, where W is an aperture dimension related to the array, and where n is any integer;
   a transducer disposed on the substrate for generating surface acoustic waves in the substrate material; and
   a carrier for carrying said substrate, said carrier having a cavity disposed between the substrate and the inside wall of the pipe for allowing electrical connections from the transducer to a region outside the pipe.

* * * * *